Jan. 16, 1940.  D. GLAXNER  2,187,601
METHOD OF NODULIZING
Filed Dec. 17, 1937
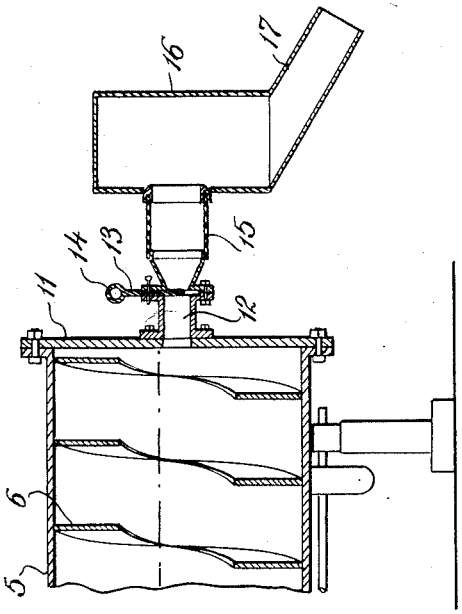
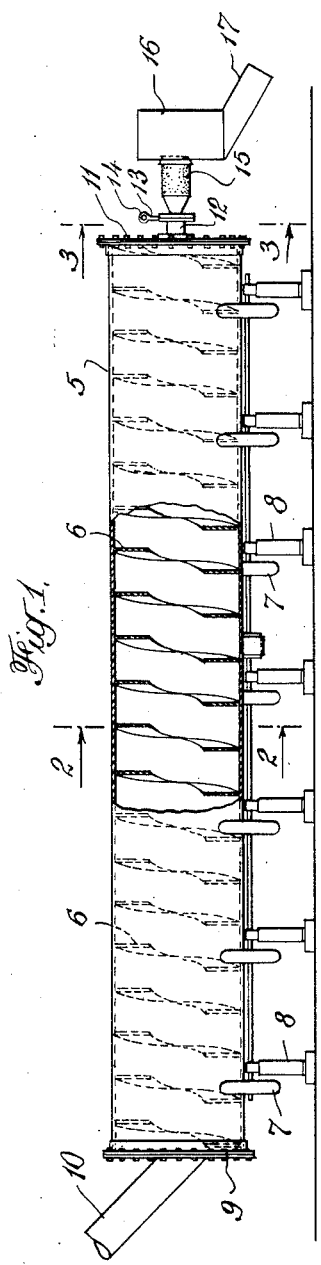
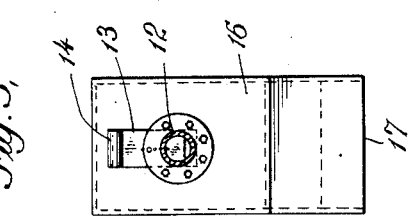
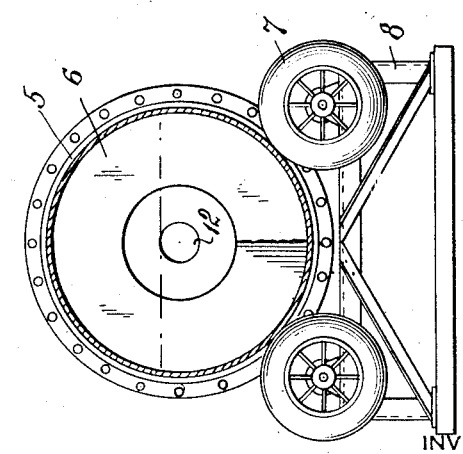
INVENTOR
Daniel Glaxner
BY
Pennie Davis Marvin & Edmonds
ATTORNEYS Patented Jan. 16, 1940

2,187,601

UNITED STATES PATENT OFFICE 2,187,601

METHOD OF NODULIZING

Daniel Glaxner, Pampa, Tex., assignor to Columbian Carbon Company, New York, N. Y., a corporation of Delaware Application December 17, 1937, Serial No. 180,299

2 Claims. (Cl. 134—60)

This invention relates to a method of nodulizing powdery materials and particularly carbon black, the latter term being used in its broader sense to include gas blacks, lamp blacks, and other analogous carbon products used as pigments or fillers.

There are a variety of carbon products obtained generally by combustion of gas, oil, etc., and loosely termed "carbon black". These products have the general characteristic of being exceedingly light and fluffy because of the extremely fine division of the constituent particles. In certain types of carbon black, the product weighs from 6 to 10 pounds per cubic foot. Other analogous products may weigh upward to 25 pounds per cubic foot. All of them are difficult to handle, ship, store and use. There are various other pulverulent materials employed in commerce having similar characteristics which may be treated successfully in accordance with the present invention.

Carbon black is used extensively in the manufacture of rubber compositions, paints, printers inks, etc. Because of the light and fluffy characteristic of this material, there is a substantial loss thereof by dusting. The dust contaminates other materials to which it may have access, and constitutes an annoyance and danger to workmen who are likely to inhale the dust.

Various methods have been proposed heretofore to avoid the difficulties incident to the use of carbon black and similar products. The known methods are costly in installation and operation, and therefore unsatisfactory.

It is the object of the present invention to provide an improved method of and apparatus for treating powdery materials, and particularly carbon black, to reduce the bulk and especially the dustiness of the product, by nodulizing or forming the material into aggregates which can be packed, shipped, stored and used with the minimum of dusting. In addition, the improvement affords a reduction of the bulkiness of the product, thus reducing the size of the necessary containers for shipment and storage.

Other objects and advantages of the invention will be apparent as it is better understood by reference to the following specification and accompanying drawing, in which Fig. 1 is an elevation, partially in section, of an apparatus adapted for the practice of the invention;

Fig. 2 is a section on the line 2—2 of Fig. 1;

Fig. 3 is a section on the line 3—3 of Fig. 1; and

Fig. 4 is a longitudinal section through the outlet mechanism.

In carrying out the invention, the material is introduced to a revolving chamber in which it is continuously tumbled and subjected to frictional contact with the walls of the chamber as it advances slowly therethrough, the advance of the material being controlled by a helical fin projecting from the inner wall of the chamber. As the material advances, it gradually forms into nodules or pellets more or less spherelike in form and varying somewhat in size. At the same time, the density of the material is materially increased, so that a carbon product originally weighing from 6 to 10 pounds per cubic foot may have, when nodulized, a density of from 20 to 30 pounds per cubic foot. The size of the nodules may be controlled to some extent by regulating the rate of travel of the material through the nodulizing chamber. It is preferable to maintain a substantially definite amount of material in the chamber at all times. To accomplish this, the rate of feeding and the rate of discharge should be substantially the same. The regulation is most readily effected by providing a valve at the outlet. The level of the material in the chamber should be above that of the outlet. By manipulating the valve, the operator may prevent discharge of the material in the form of nodules more rapidly than the fresh material is introduced at the other end of the chamber. In this way, a substantially uniform nodulized product, which is practically free from dust, can be secured without the addition of binders or other extraneous material which might reduce the quality of the product or make it unacceptable for the purposes for which it is commonly used.

The accompanying drawing illustrates the preferred form of apparatus in which the method as previously described may be successfully carried out. Referring to the drawing, 5 indicates a cylinder of steel, steel alloy, or other suitable material adapted to afford the necessary strength and to resist abrasion. A helix 6 is secured to the internal wall of the cylinder, and extends throughout its length, thus dividing the cylinder into a multiplicity of connected chambers through which the material will slowly advance as the cylinder revolves. The cylinder is supported preferably upon a plurality of rollers 7 supported for revolution on a frame 8. Conveniently, the rollers are wheels provided with pneumatic tires, although any desired form of rollers can be employed. The rollers can be driven from any suitable source of power to effect rotation of the cylinder 5 at a relatively low rate of speed.

At one end, the cylinder 5 is provided with a head 9 with an opening therein through which the feed pipe 10 extends. The feed pipe can be connected to any suitable source of supply from which the material to be treated is delivered to the cylinder 5. The opposite end of the cylinder is closed by a head 11. A pipe 12 is connected to the head 11. A valve 13, having an operating handle 14, is disposed in the pipe 12 for the purpose of regulating the flow of nodules from the cylinder. By opening or closing the valve, the operator may increase or decrease the rate of delivery in relation to the amount of material entering the cylinder, so that a substantially fixed amount thereof is retained always in the cylinder during operation.

To the outlet pipe 12, a connection 15 of flexible material such as rubber is secured and projects into a box 16, to which the delivery chute 17 is connected. The nodules as discharged are delivered through the chute 17 onto a conveyor or elevator, whereby they may be transported to the packing plant.

As a specific application of the invention, I have found satisfactory a cylinder five feet in diameter and forty-five feet in length, with a helix one and one-half feet wide attached to the inner surface of the cylinder. The helix may have a twelve-inch pitch. In such an apparatus, I prefer to maintain from 3,000 to 4,000 pounds of material during the operation, the amount of material being maintained substantially constant by feeding fresh material continuously and withdrawing a regulated quantity of the nodulized material under the control of the outlet valve. The method as conducted in such an apparatus with a very light and fluffy carbon black readily produces nodules of considerably greater density than the original material and substantially free from dust. Such nodules can be handled without distributing dust in the air. They can be packed in less bulky containers and shipped readily. The nodulizing of the material does not affect its quality, and the nodules may be utilized for all of the usual purposes for which the material is adapted. When the material is to be used, the nodules can be crushed and the fine particle size which is essential in pigments and fillers will be still characteristic of the material, that is to say, nodulizing does not affect the particle size, the material being merely formed temporarily into aggregates to facilitate handling.

The advantages of the invention will be sufficiently apparent from the foregoing description, which is illustrative of the method and apparatus, without restricting the scope of the invention, and various changes may be made in the procedure and particularly in the apparatus employed, without departing from the invention or sacrificing any of its advantages.

I claim:

1. The method of nodulizing carbon black in a substantially horizontally disposed drum having a fin projecting inwardly from the inner wall thereof and extending helically therethrough to provide a horizontal, elongated, helical path through the drum which comprises introducing a mass of dry fluffy carbon black into the drum, slowly advancing the carbon black through said helical path by slow rotation of the drum to cause the fin to exert a constant forward pressure against the rear of the carbon black in said path and to cause a rolling or tumbling of the carbon black as it slowly passes through said helical path, thereby to cause the particles of the carbon black to frictionally contact one another and the confining walls of the path, said helical path being of sufficient length that the carbon black passing therethrough is compacted and the particles thereof caused to adhere and agglomerate into substantially dustless, free-flowing nodules by said rolling or tumbling motion, and discharging the nodulized carbon black substantially continuously.

2. The method of nodulizing carbon black in a substantially horizontally disposed drum having a fin projecting inwardly from the inner wall thereof and extending helically therethrough to provide a horizontal, elongated, helical path through the drum which comprises introducing a mass of dry fluffy carbon black into the drum, slowly advancing the carbon black through said helical path by slow rotation of the drum to cause the fin to exert pressure against the rear of the carbon black in said path, rolling or tumbling the carbon black as it slowly passes through said helical path to cause the particles thereof to frictionally contact one another and the confining walls of the path, said helical path being of sufficient length that the carbon black passing therethrough is compacted and the particles thereof caused to adhere and agglomerate into substantially dustless, free-flowing nodules by said rolling or tumbling motion, discharging the nodulized carbon black substantially continuously, feeding fresh carbon black at substanially the rate of discharge, and regulating the rate of discharge to maintain the quantity of material under treatment practically constant.

DANIEL GLAXNER.

CERTIFICATE OF CORRECTION.

Patent No. 2,187,601. January 16, 1940.

DANIEL GLAXNER.

It is hereby certified that error appears in the printed specification of the above numbered patent requiring correction as follows: Page 2, second column, line 40, claim 2, after the word "exert" insert a constant forward; line 41, same claim, for "path, rolling or tumbling" read path and to cause a rolling or tumbling of; line 43, for "path to cause the particles thereof" read path, thereby to cause the particles of the carbon black; and that the said Letters Patent should be read with this correction therein that the same may conform to the record of the case in the Patent Office.

Signed and sealed this 12th day of March, A. D. 1940.

(Seal)

Henry Van Arsdale,
Acting Commissioner of Patents.